United States Patent Office 2,926,098
Patented Feb. 23, 1960

2,926,098

BINDER FOR FOUNDRY MOLDS

Frank P. Ilenda and James L. Foster, Painesville, Ohio, assignors to Diamond Alkali Company, Cleveland, Ohio, a corporation of Delaware No Drawing. Application October 14, 1955
Serial No. 540,633

1 Claim. (Cl. 106—38.35)

This invention relates to improvements in the preparation of molds for metal casting operations and more particularly relates to new and improved compositions and processes for the preparation of alkali metal silicate-containing mold-forming materials.

In recent years there has been a considerable interest in the preparation of molds and cores from sand-silicate binders hardened by injections of carbon dioxide. Generally, the preparation of such molds and cores embodying a binder of this type involves a chemical reaction between carbon dioxide or other gaseous material with an alkali metal silicate dispersed throughout the sand to form a silicon dioxide as a gel. This gel, dispersed uniformly throughout the sand mixture serves as an excellent binder.

The advantages of such molds are many. Not only are aging and post-curing treatments eliminated, thus permitting rapid fabrication of molds without requiring the use of expensive equipment, but also the process is simple and can readily be carried out on a large scale.

However, despite the advantages of molds and cores formed in the foregoing manner, it has been found that several inherent qualities of prior mold-forming compositions of this type have seriously restricted and/or precluded entirely the widespread application of this mold-forming technique.

One of the most troublesome problems heretofore encountered has been the high strength and adherence, i.e., non-collapsibility, of the mold-forming mixture within casting cavities after molding is completed. In the very parts which otherwise might most advantageously be cast in accordance wtih this technique, i.e., intricately-shaped articles, the retention in tiny and intricate passages and cavities in such cast parts have heretofore required expensive and difficult cleaning operations subsequent to casting, or have precluded the use of this technique.

Prior art proposals to improve the collapsibility of the fired mold compositions have not proved to be a complete solution to the problem. Accordingly, the principal object of this invention is to provide a mold-forming material adapted to be hardened by exposure to carbon dioxide or other gaseous material which material is characterized by improved collapsibility while providing a high green strength.

A further object of the invention is to provide compositions and methods for forming improved molds adapted to be cured by exposure to carbon dioxide or other gaseous materials.

A still further object of the invention is to provide an improved shell mold and methods of shell molding.

These and other objects and advantages of the invention will appear more fully from the following description thereof.

The present invention contemplates the use as a binder composition in the preparation of molds a mixture comprising an alkali metal silicate having a silica to alkali metal oxide ratio within the range from 2.0 to 3.22 and minor amounts of at least one substance selected from the group consisting of polyhydroxy organic compounds and materials capable of liberating gas at relatively low temperatures and capable of dissolving in and not gelling said silicate.

More particularly, the present invention contemplates the use as a binder composition in forming molds of a composition comprising a silicate of the foregoing type in admixture with at least one substance selected from the group consisting of polyhydroxy organic compounds and substances capable of liberating ammonia under conditions of mold use while the mold-forming material still is in a plastic state whereby during heating of the mold by metal contained therewithin said materials cause an intumescence thereby providing an excellent porosity and low fired strength, i.e., high collapsibility.

In many instances a preferred practice of this invention contemplates the use of a binder comprising a silicate of the foregoing type in combination with both a polyhydroxy organic compound and a gas-liberating substance as previously described. Especially advantageous results are obtained when a compound capable of liberating ammonia under conditions of mold use is employed in combination with a polyhydroxy mixture with the silicate component.

The practice of this invention contemplates the use of a binder as described above in combination with a finely-divided refractory material to form a molding material which may be hardened or cured by contact with a gaseous reagent thereby to convert the silicate to a finely dispersed gel form of silicon dioxide. In this process, the organic ingredients employed in the practice of this invention are generally completely burned out of the mixture thereby providing high porosity and improved mold collapsibility after casting.

The silicate employed in the practice of this invention, as indicated hereinbefore, should be an alkali metal silicate having a silica to alkali metal oxide ratio within the range from 2.0 to 3.22, silicates having a silica to alkali metal oxide ratio within the range from 2.4 to 2.84 being preferred. Moreover, it has been found that superior results are obtained when the silicate having a ratio within the foregoing ranges also is characterized by a solids content of at least 39% by weight, 45% by weight being preferred. Silicates containing less than about 39% by weight solids in some instances tend to form molding mixtures which lead to the production of poorly bound refractory materials. While the expression alkali metal silicate is intended to include silicates of the various alkali metals, i.e., sodium, potassium, rubidium, cesium, and lithium, silicates of sodium are generally preferred because of their lower cost and ready availability.

It has further been found desirable that the mold-forming composition contain a humectant to preclude too rapid drying of the mold-forming composition prior to use. In some instances compounds employed in the mixture as indicated above will serve as suitable humectants. In other instances, other compounds may be added as humectants.

The expression "polyhydroxy organic compound" as used in the specification and claims is intended to include a variety of organic compounds containing more than one hydroxy grouping. Especially preferred are sugars such as glucose, fructose, sucrose and various other mono- and di-saccharides, as will as certain tri- and tetra-saccharides. As will be appreciated, the sugar need not be in a highly purified state. On the contrary, excellent results have been obtained using relatively impure sugars, such, e.g., as tanner's sugar, which is preferred at present, black strap molasses, bagasse, as well as other low cost sugar products. In addition to sugars, the practice of this invention also contemplates the use of various glycols such as ethylene glycol, propylene glycol, as well as their polymerized forms such as polyethers embodying various glycollic structures. Another type of compound which may be characterized as a polyhydroxy organic compound suitable for use in the practice of this invention are various polyhydroxy alcohols such as glycerol, sorbitol, and other hydroxy alcohols containing more than one hydroxy grouping.

The component providing the desired gas-liberation under molding conditions while the refractory mix containing the binder is still in a plastic condition may comprise various substances although in practice, it is preferred presently to employ a substance which liberates ammonia upon exposure to the heat present during metal casting. A particularly preferred compound of this type is urea, which has the additional advantage of liberating not only ammonia but carbon dioxide which facilitates curing and acids in maintaining an excellent casting-defining surface, yet provides an improved collapsibility after the cast metal solidifies. In addition to urea, of course, other nitrogen and hydrogen containing compounds may be employed, e.g., various amines and amides.

While carbon dioxide or gases containing carbon dioxide comprise a presently preferred form of curing agent, it is to be understood that other gaseous materials or mixtures of gases also may be employed. For example, sulfur dioxide, nitrous oxide, hydrogen chloride, and the like also may be used. Moreover, in many instances, various stack gases or other combustion gases containing proportions of carbon dioxide also may be utilized.

In practice, molds embodying the present invention may be prepared by blending with a finely-divided refractory material such as Ottowa sand, silica flour, or other suitable refractory mold-forming materials, a minor amount of a binder comprising a silicate as hereinbefore described and other components also described above. Generally, it is desired to employ about 3% to 8% by weight of total silicate-organic binder, 4% to 5% by weight, based on the total weight of the refractory material being preferred. In some instances, higher organic contents in the binder, e.g., 30%, are desirable when casting iron, steel and various alloys. The refractory material, hereinafter frequently referred to as sand, for convenience, is blended with the binder which term should be construed as referring to the various binder compositions of the invention, in any suitable manner as by mulling or other mixing operation. The thus-prepared mixture then is placed in contact with a mold-defining surface such as a pattern which can, if desired, be coated with a suitable dry, powdered parting or separating agent. With the sand-binder mixture in contact with the mold-defining surface, it generally is desirable to compress the mixture slightly as by compacting it against the surface. The thus-compacted material is then impregnated with carbon dioxide or other suitable gaseous reactant as described hereinbefore for a short time to complete the curing of the mold. Typically, carbon dioxide may be injected through the sand-binder mixture for periods of a few seconds up to a minute or more, depending on the size of the mold being prepared, the fineness of the refractory material, the proportions of reactants and the like. After the gas treatment, the mold is ready for immediate use without aging, heating, or curing treatments or other processing.

The following specific examples are provided to illustrate the excellent fired strength and green strength of molds embodying the present invention, which strengths, of course, reflect an excellent collapsibility of a mold after completion of the metal solidification therein, and additionally indicate a green strength sufficient to permit even relatively rough treatment of molds embodying this invention prior to pouring of metal therein without injury thereto. The data indexed comparatively below is obtained by preparing two-inch cubes from a mixture of Ottowa 100 grain sand containing less than 0.25% water and 5% by weight of said sand of a binder comprising an alkali metal silicate and varying organic additives, and subjecting such cubes to compression loading both in the green state and after exposure to an elevated temperature. A Tinius Olsen compression testing machine is employed in all instances. In the case of the so-called "Fired strengths," the cubes are heated for one hour at 1400° F. prior to testing. The types of silicate employed and the organic additives are specified in the table below.

| Example No. | Binder (5% by wgt. of sand) | Green Strength (p.s.i.) | Fired Strength (p.s.i.) |
| --- | --- | --- | --- |
| I | 5% glycerine, 95% Sodium Silicate ($SiO_2$:$Na_2O$=2.4:1.0), 46.6% Solids. | 101.0 | 292.0 |
| II | 5% urea, 95% Sodium Silicate ($SiO_2$:$Na_2O$=2.4:1.0) 46.6% Solids. | 97.5 | 777.0 |
| III | 5% sorbitol, 95% sodium silicate ($SiO_2$:$Na_2O$=2.4:1.0) 46.6% Solids. | 107.5 | 467.0 |
| IV | 10% glycerine, 90% sodium silicate ($SiO_2$:$Na_2O$=2.40:1.0) 46.6% Solids. | ......... | 325.0 |
| V | 10% urea, 90% sodium silicate ($SiO_2$:$Na_2O$=2.84:1.0) 42.2% solids. | 87.5 | 100.0 |
| VI | 10% Tanner's sugar [1], 90% sodium silicate ($SiO_2$:$Na_2O$=2.84:1.0) 42.2% Solids. | 128 | 177 |
| VII | 5% urea, 5% sorbitol, 90% sodium silicate ($SiO_2$:$Na_2O$=2.84:1.0) 42.2% solids. | 102 | 291 |
| VIII | 5% urea, 5% glycerine, 90% sodium silicate ($SiO_2$:$Na_2O$=2.84:1.0) 42.2% Solids. | 126 | 147 |
| IX | 5% urea, 5% Tanner's Sugar [1], 90% sodium silicate, ($SiO_2$:$Na_2O$=2.84:1.0). | 109 | 275 |

[1] Glucose—unrefined corn sugar syrup.

As the foregoing data indicates, by the practice of this invention there is obtained an excellent green strength which permits ready handling of cured molds prior to the actual metal casting, while the fired strengths of such mold-forming compositions are low enough to provide excellent collapsibility after solidification of metal within the mold.

To illustrate the improvement over molds formed from a mixture of the identical sand and silicate, i.e., a sodium silicate having a silica to sodium oxide ratio of 2.4:1.0 and a solids content of 46.6%, but containing no organic additives of this invention is prepared. A two-inch cube of the type tested in preparing the foregoing examples is formed from a mixture of 95% of the same sand previously used and 5% by weight thereof of sodium silicate having a silica to sodium oxide ratio of 2.4:1.0 and comprising 46.6% solids. The green strength of such a cube is 101 p.s.i. while the fired strength after exposure for one hour at a temperature of 1800° F. is 1550 p.s.i. Hence, it will be appreciated that binders of this invention in many instances provide substantially improved green strength, in any event not significantly reducing the green strength below that obtained using a straight silicate binder, and equally important provide a singularly reduced fired strength which permits ready removal of the mold-forming mixture after the metal contained therein has solidified.

It will be understood that the term "mold" as well as the expression "mold-forming materials" are applied in a generic sense to mean a casting form which includes both molds and cores, this invention in no manner being limited to the former. Moreover, these expressions are also intended to include the preparation of certain patterns for use in the metal casting art.

As those skilled in the art will realize, the practice of this invention is advantageous in the shell molding art which employs thin-walled dispensable molds and cores generally formed of sand and a suitable binder. In the past, shell molding processes generally have utilized a thermo-setting binder and have required a heat curing step prior to use. By the practice of this invention, shell molding operations may be conducted using rigid, thin molds having high gas permeability, good surface smoothness and dimensional stability formed in accordance with this invention by applying a layer of a mixture embodying the invention against a pattern. The thus-formed layer in contact with the pattern can then readily be subjected to the action of carbon dioxide or other gases as described hereinbefore. By such a process there is formed a shell type mold section accurately reproducing pattern details. By providing complementary shell mold sections which define therebetween the casting, the many advantages of the shell molding art can be realized without employing the expensive and often critical heat curing heretofore an essential feature of the shell molding operation.

While various sands are perhaps the most common source of the refractory material in foundry operation, e.g., the Ottawa sand hereinbefore described, this invention, of course, contemplates that various other refractory materials also may be employed, e.g., finely divided alumina, zirconia, ground silica firebrick, ground magnesia firebrick, fused magnesia, titanium oxide, beryllium oxide, mullite, sillimanite and the like also may be employed.

In many instances it is desirable to employ a minor amount of a wetting agent in this application. Various commercially available wetting agents selected from the non-ionic, anionic and cationic types can be employed. The presently preferred wetting agent is the commercially available product known as Ultra Wet DS in an amount of 0.1% by weight of the silicate. In addition to the Ultra Wet DS (alkyl benzene sodium sulfonate), other suitable wetting agents are illustrated by the commercially available products, Tergitol NP 35, Nekal WS 25, Span 20 (sorbitan monolaurate), Tween 20 (polyoxyethylene sorbitan monolaurate), Igepal CO 530, 630, 730 (alkyl phenoxy polyoxyethylene ethanol), and the like.

In some instances, it may be desirable to incorporate into the refractory material, in addition to the organic-silicate mixture, finely-divided substances which are not accurately termed refractory or binder constituents. In certain instances, minor amounts of materials such as finely divided coke, coal, wood, e.g., sawdust, corn flour, other plant flours, graphite, carbon black and the like may be added.

It is to be understood that although the invention has been described with specific reference to particular embodiments thereof, it is not to be so limited, since changes and alterations therein may be made which are within the full intended scope of this invention as defined by the appended claim.

What is claimed is:

A composition of matter for use in forming a mold for metal casting, said composition consisting essentially of a major proportion of a finely-divided refractory material, a minor mold collapsibility-providing proportion of a binder comprising sodium silicate containing at least about 39% by weight of solids, having a silica to sodium oxide ratio within the range from 2.0 to 3.22:1.0 and, in combination therewith, about 5% to 10% of urea by weight of the silicate and about 5% to 10% of sorbitol by weight of the silicate.

References Cited in the file of this patent

UNITED STATES PATENTS

| | | |
|---|---|---|
| 1,247,595 | Tompkins | Nov. 20, 1917 |
| 2,078,836 | Carter | Apr. 27, 1937 |
| 2,480,896 | Bean | Sept. 6, 1949 |
| 2,494,403 | Nies et al. | Jan. 10, 1950 |
| 2,521,839 | Feagin | Sept. 12, 1950 |
| 2,671,747 | Lander | Mar. 9, 1954 |
| 2,736,678 | Olix | Feb. 28, 1956 |

FOREIGN PATENTS

| | | |
|---|---|---|
| 710,099 | Great Britain | June 9, 1954 |
| 745,402 | Great Britain | Feb. 22, 1956 |
| 986,904 | France | Apr. 11, 1951 |

OTHER REFERENCES

Schumacher: "Carbon Dioxide Process for Making Molds and Cores," American Foundryman, September 1954, pages 46–49.